United States Patent [19]

Ohshima et al.

[11] Patent Number: 5,140,157
[45] Date of Patent: Aug. 18, 1992

[54] DOUBLE BEAM SCAN TYPE OPTICAL APPARATUS

[75] Inventors: Minoru Ohshima; Susumu Saitoh; Masami Ishikawa; Tsukasa Ogawa; Kazutoshi Obara, all of Ibaraki, Japan

[73] Assignee: Hitachi Koki Co., Ltd., Tokyo, Japan

[21] Appl. No.: 668,903

[22] Filed: Mar. 13, 1991

[30] Foreign Application Priority Data

Mar. 16, 1990 [JP] Japan .................................. 2-67872

[51] Int. Cl.$^5$ ............................................ H01J 3/14
[52] U.S. Cl. .................................... 250/235; 346/108
[58] Field of Search ............... 250/235, 234, 236; 359/17, 213, 216, 217; 346/107 R, 108, 157, 160; 358/481, 494, 495, 496, 497

[56] References Cited

U.S. PATENT DOCUMENTS

| 4,725,855 | 2/1988 | Arimoto et al. | 346/108 |
| 4,760,407 | 7/1988 | Arimoto et al. | 346/108 |
| 4,768,043 | 8/1988 | Saito et al. | 346/108 |
| 4,908,634 | 3/1990 | Arimoto et al. | 346/108 |
| 5,006,705 | 4/1991 | Saito et al. | 250/235 |
| 5,053,619 | 10/1991 | Arimoto | 250/235 |

FOREIGN PATENT DOCUMENTS 3926636 2/1990 Fed. Rep. of Germany .
5767374 10/1980 Japan .

OTHER PUBLICATIONS

"Ohyou Hikari Erekutoronikusu (Opto–Electronics Applications) Handbook", Apr. 1989 (no translation readily available).

Primary Examiner—Janice A. Howell
Assistant Examiner—Kiet T. Nguyen
Attorney, Agent, or Firm—Cushman, Darby & Cushman

[57] ABSTRACT

A double beam scan type optical apparatus for use in a laser printer or the like. Such apparatus comprises two light sources and a lens system which provide scanning means for scanning a surface with parallel output light beams of the two light sources and beam distance controlling means for controlling the distance between the light beams. The reliability of the invention is improved by monitoring the intensity of the beams. Beam intensity checking means provide signals to verify that the intensity of each beam is maintained equal thus assuring that no abnormal conditions exist with the light sources or the lens system of the apparatus.

6 Claims, 8 Drawing Sheets

| S | $V_A$ | $V_B$ | $V_C$ | $V_D$ | $V_E$ | $V_F$ |
|---|---|---|---|---|---|---|
| $S_a$ | 1 | 1 | 1 | 1 | 1 | 1 |
| $S_b$ | 0 | 1 | 0 | 1 | 1 | 1 |
| $S_c$ | 0 | 0 | 0 | 1 | 0 | 1 |

DOUBLE BEAM SCAN TYPE OPTICAL APPARATUS

BACKGROUND OF THE INVENTION

1. Field of the Invention

This invention relates to a double beam scan type optical apparatus. Such apparatus are used in laser printers and the like.

2. Description of the Related Art

In a laser printer in which the laser beam is deflected in a scan mode, in order to increase the scanning speed or scanning accuracy it is necessary to increase the number of times that the scanning beam strikes the scanning surface. In order to meet this requirement, a method exists in which a plurality of light sources are provided, and the output light beams of these light sources are simultaneously deflected in a scan mode. That is a beam position control method by servo control using a light position detector for maintaining the accurate mutual positions of a plurality of light sources.

Figure 9:
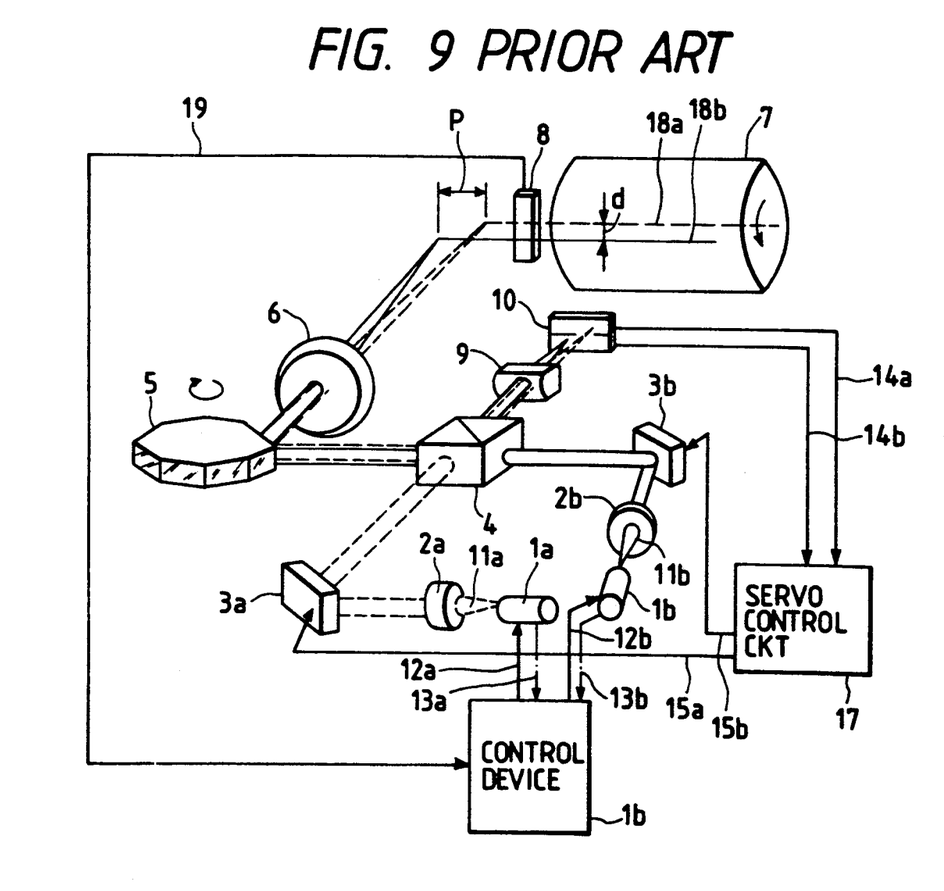
FIG. 9 (prior art) is an explanatory diagram for a description of a conventional laser beam control method using two light sources.

FIGS. 9 through 12 (prior art) show one example of a conventional laser beam control method using two light sources (cf. the publication "Ohyou Hikari Erekutoronikusu (Opto-electronics Applications) Handbook", April 1989). As shown in FIG. 9 (prior art), the output light beams 11a and 11b of two light sources 1a and 1b are collimated by coupling lenses 2a and 2b so that they are applied to a light splitter 4 by way of movable reflectors 3a and 3b, respectively. As a result, the two light beams are split in such a manner that they advance towards a light deflector 5 and a light position detector 10.

The light beams advancing towards the light deflector 5 are focused on a drum surface 7 by an Fθ lens 6 or the like, so that two scanning lines 18a and 18b are formed as the light deflector 5 rotates. The light beams 11a and 11b forming the two scanning lines 18a and 18b are moved across a light scan detector 8 with a distance P therebetween in a main scanning direction, and the light scan detector 8 outputs light beam (11a and 11b) passage signals 19. A control device 16 receives the light beam passage signals 19 as reference signals, and applies printing signals, as modulating signals 12a and 12b, to the light sources 1a and 1b to modulate the light sources 1a and 1b. As a result, printing information is applied to the drum surface 7.

On the other hand, the light beams advancing towards the light position detector 10 are focused on the surface of the light position detector 10 by a focusing lens 9. The light position detector 10 is a position detecting sensor for maintaining the relative positions of the two light beams 11a and 11b constant. The drum surface 7 and the light position detector 10 are in the focusing planes of the lens systems. Therefore, the beam diameters and the beam distances on the drum surface 7 and those on the light position detector 10 are in proportion to each other. Hence, the distance (d) between the auxiliary scanning directions of the scanning lines 18a and 18b on the drum surface 7 can be maintained constant by maintaining the beam distance on the light position detector 10 constant For this purpose, the light position detector 10 applies beam position signals 14a and 14b representing the beam positions to a servo control circuit 17. The latter 17 processes the beam position signals 14a and 14b to provide beam correcting signals 15a and 15b to move the movable reflectors 3a and 3b, thereby controlling the beam positions on the light position detector 10.

Figure 10:
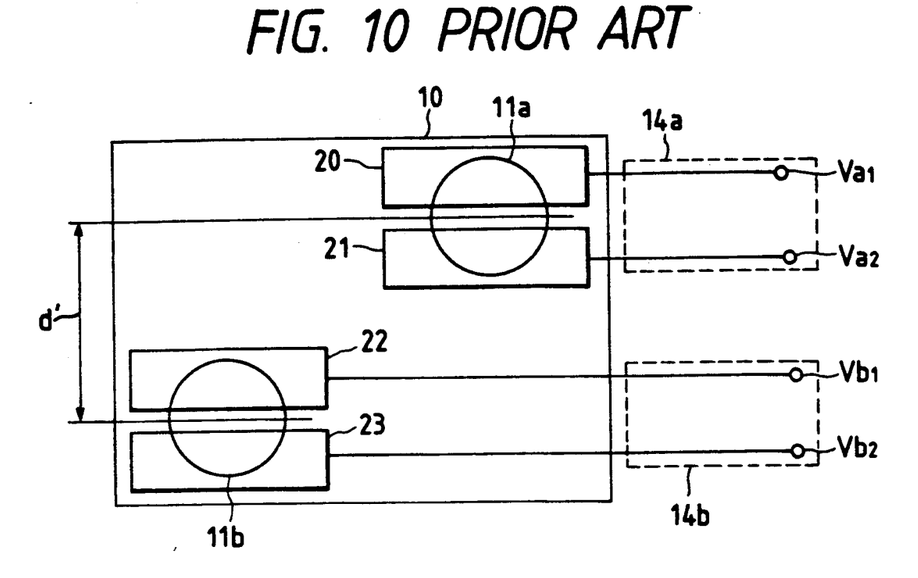
FIG. 10 (prior art) is an explanatory diagram showing the arrangement of a light position detector 10 in FIG. 9.
Figure 11:
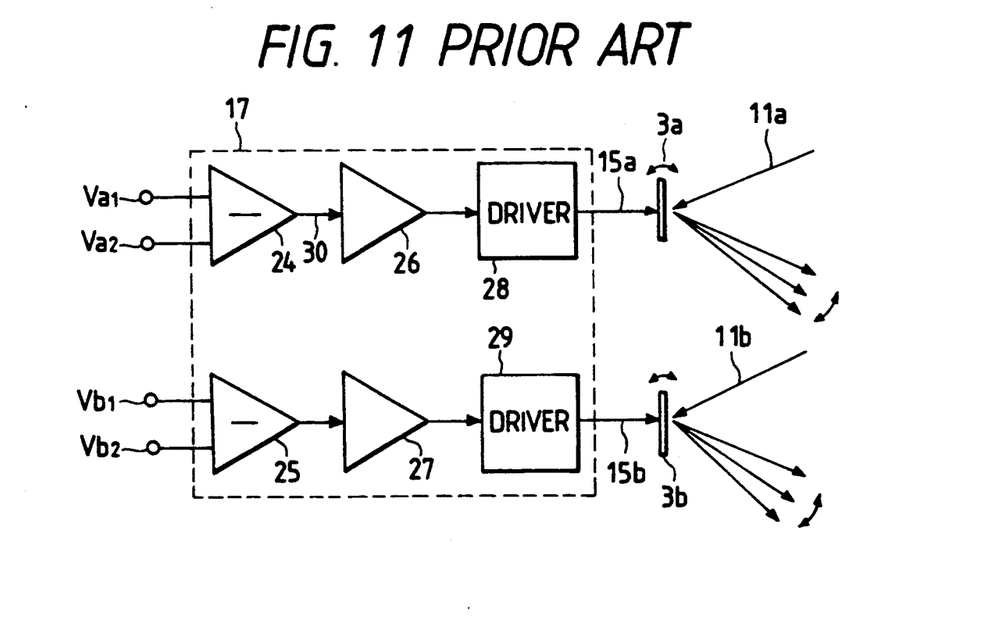
FIG. 11 (prior art) is an explanatory diagram showing the arrangement of a servo control circuit 17 in FIG. 9 (prior art)

FIG. 10 (prior art) shows the arrangement of the light position detector 10 shown in FIG. 9 (prior art), and FIG. 11 (prior art) shows the arrangement of the servo control circuit 17 shown in FIG. 9 (prior art).

In the light position detector 10, as shown in FIG. 10 (prior art) the light beam 11a is applied to photo-detectors 20 and 21, which output beam position signals $Va_1$ and $Va_2$, respectively. Similarly, in response to the application of the light beam 11b to photo-detectors 22 and 23, beam positions signals $Vb_1$ and $Vb_2$ are output. As shown in FIG. 11 (prior art), the beam position signals $Va_1$ and $Va_2$ are applied to a difference output unit 24 which provides a difference signal 30. The difference signal 30 is $Va_1 - Va_2$. The difference signal 30 is amplified by an amplifier 26, the output of which is applied to a driver 28. In response to the output of the amplifier 26, the driver 28 applies the beam correcting signal 15a to the movable reflector 3a, so that the reflector 3a is so moved as to decrease the difference signal 30. As a result, the difference signal 30 is zeroed; i.e., $Va_1 - Va_2 = 0$ is established with the light beam 11a positioned between the photo-detectors 20 and 21 Similarly, $Vb_1 - Vb_2 = 0$ is established with the light beam 11b positioned between the photo-detectors 22 and 23. Thus, with the light beams 11a and 11b being servo-controlled, the beam distance (d') is maintained constant.

Figure 12:
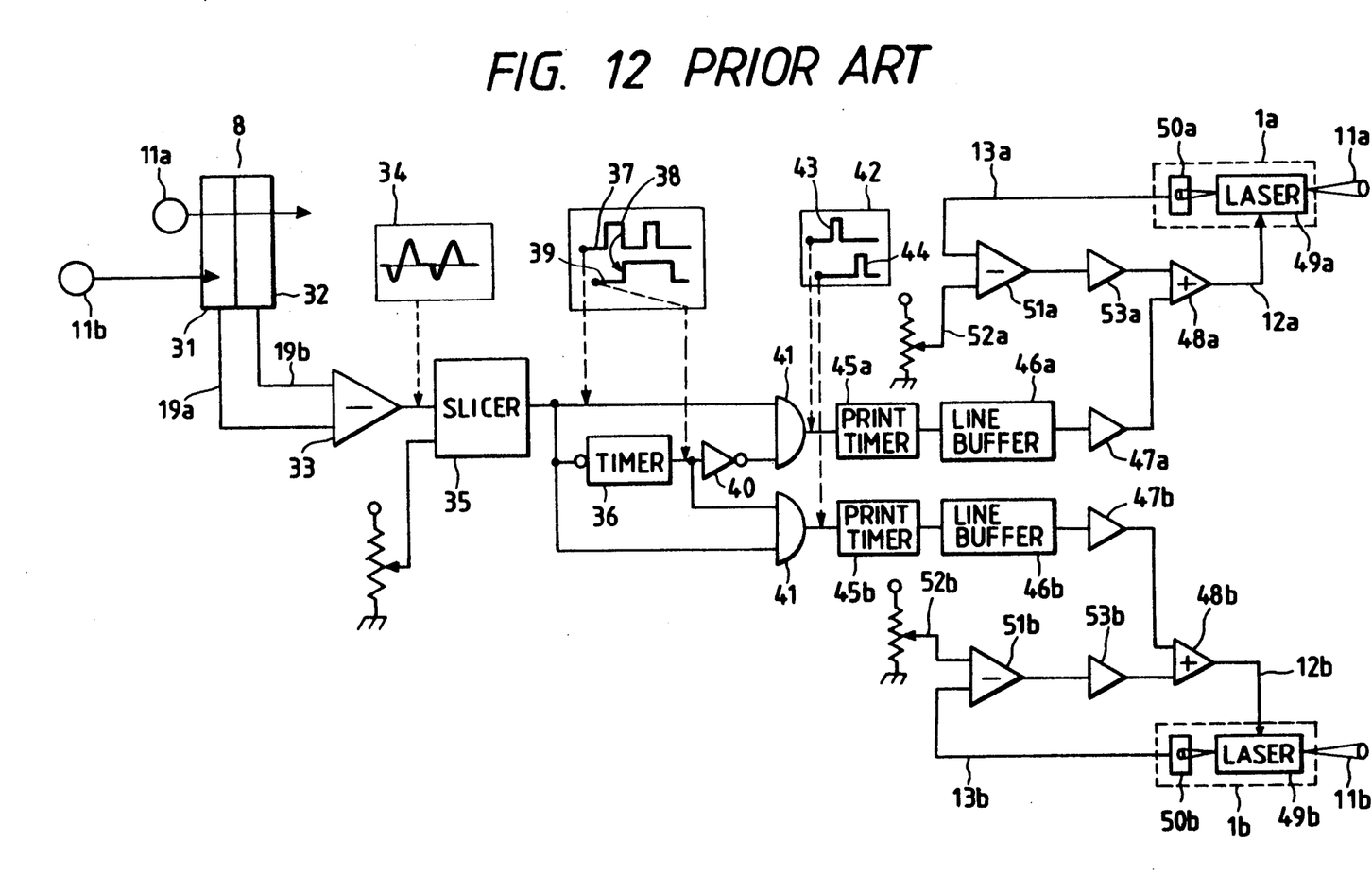
FIG. 12 (prior art) is a circuit diagram showing the arrangements of light emitting sources 1a and 1b which are semiconductor lasers, a light scan detector, and a control unit.

FIG. 12 (prior art) shows the arrangements of the light sources 1a and 1b which are semiconductor lasers, the light scan detector 8, and the control device 16. As shown in FIG. 12 (prior art), the light scan detector 8 comprises a front detector 31 and a rear detector 32, to which the beams 11a and 11b are applied successively, as a result of which the front detector 31 outputs a front passage signal 19a and the rear detector 32 outputs a rear passage signal 19b. Those passage signals 19a and 19b are applied to a difference output unit 33 which provides a difference analog output 34. The output 34 is supplied to a slicer 35 where it is sliced near OV. That is, the difference analog output 34 is sliced near the zero cross. The instants of time that the centers of the light beams 11a and 11b reach the boundary of the front detector 31 and the rear detector 32 are detected, and the difference in diameter of the light beams 11a and 11b is compensated. Thus, the sliced signal is a pulse signal 37. The pulse signal 37 is applied to a timer 36 which is started by the trail edge 38 of the pulse signal 37 so that the timer 36 provides a timer output 39. The pulse signal 37 is further applied to AND gates 41. The timer output 39 is supplied to one of the AND gates 41 and an invertor 40, the output of said invertor 40 is applied to the other AND gate 41. Thus, the AND gates 41 output signals 43 and 44, respectively. These output signals 43 and 44 are converted by print timers 45a and 45b into print start signals indicating the arrival of the beams 11a and 11b to the print start positions respectively, to make access to line buffers 46a and 46b in which printing data has been stored, respectively. The line buffers 46a and 46b apply the printing signals to voltage-current exchangers 47a and 47b, which provide the modulating signals for the light source 1a and 1b, respectively. The outputs of the voltage-current exchangers 47a and 47b are applied to current adders 48a and 48b respectively.

The light sources 1a and 1b comprise: semiconductor lasers 49a and 49b; and laser power monitor sensors 50a and 50b, respectively. When energized, the semiconductor lasers 49a and 49b output the beams 11a and 11b and also output light beams to the laser power monitor sensors 50a and 50b in proportion to the beams 11a and 11b, respectively. In response to the light beams, the laser power monitor sensors 50a and 50b output beam power signals 13a and 13b which are supplied to power difference output units 51a and 51b, respectively. The power difference output unit 51a outputs the difference between the beam power signal 13a and a reference power voltage 52a and applies this output to a voltage-current exchanger 53a. The voltage-current exchanger 53a outputs current so that the difference between the beam power signals 13a and the reference voltage 52a is zeroed and applies a current signal to the current adder 48a. Similarly, the power difference output unit 51b outputs the difference between the beam power signal 13b and a reference power voltage 52b and applies this output to a monitor voltage-current exchanger 53b. The monitor voltage-current exchanger 53b outputs current so that the difference between the beam power signal 13b and the reference voltage 52b is zeroed and applies a current signal to the current adder 48b. The output current signals of the current adders 48a and 48b are applied to the semiconductor lasers 49a and 49b, so that the latter 49a and 49b provide the beams 11a and 11b with powers corresponding to the reference power voltages 52a and 52b, respectively. The two beams 11a and 11b can be maintained equal in power by adjusting the reference voltages 52a and 52b.

The above-described high-performance double beam scanning technique in which the positions of two beams are maintained constant, the difference between the beam diameters is compensated, and the beam powers are maintained unchanged suffers from the following possible reliability problems:

(1) The beams may become abnormal, therefore it is necessary to check the conditions of the two beams at all times.

(2) The cause of an abnormality is not always obvious, therefore when an abnormal condition occurs, it is necessary to detect what part of the apparatus is out of order.

Conventional techniques for solving the above-described problems (1) and (2) will be described.

A conventional technique which may solve the problem (1) has been disclosed by Japanese Patent Application (OPI) No. 67374/1982 (the term "OPI" as used herein means an "unexamined published application"). In the conventional technique, the front part of a photo-detector is designed so that the output signal of the photo-detector is sliced with a reference voltage, and the sliced signal is processed by count means and gate means so that a plurality of beams are distributed to line signals and the time interval between the first and last line signal is monitored with a timer. If this technique is applied to a double beam scanning technique, then the zero cross detection used for compensation of the difference between the beam diameters raises another problem. That is, since the slice point is near 0V as shown in FIG. 12 (prior art), if the beam power is decreased due to an abnormal condition, the difference analog output 34 is still output even though it is low, and the pulse signal is output normally. Furthermore, as for the signal check, since the access signal of the count means is provided after the slicing of the output signal of the photo-detector, the spur due to the time delay of the count means is output through the gate means, thus lowering the control reliability. Also, the method of monitoring the first and last beam signals cannot handle a high speed beam scanning operation, thus the reliability is decreased. Therefore, it is necessary to provide a technique other than that disclosed by the Japanese Patent Application (OPI) No. 67374/1982.

With respect to the above-described problem (2), the different components employed in a double beam scan technique are each subject to different abnormalities. For instance, in FIG. 9 (prior art), the lens systems suffer from a problem of possible contamination, the beams 11a and 11b for some reason may not be applied to the movable reflectors 3a and 3b, and the light sources 1a and 1b are semiconductor lasers which have a specific service life and deteriorate over time. No technique for detecting these problems individually has been provided in the prior art.

SUMMARY OF THE INVENTION

Accordingly, an object of this invention is to eliminate the above-described difficulties accompanying a double beam scanning technique.

More specifically, an object of the invention is to provide a double beam scan type optical apparatus with an improved double beam scanning technique.

The foregoing object and other objects of the invention have been achieved by the provision of a double beam scan type optical apparatus comprising: two light sources, scanning means for scanning a scanning surface with parallel output light beams of the two light sources, and beam distance controlling means for controlling the distance between the light beams. According to the invention, the beam distance controlling means further comprises: means for detecting the intensity of the light sources, means for detecting the intensity of the output light beams, and means for detecting the intensity of reference beams indicative of a positioning of said output light beams.

In the double beam scan type optical apparatus of the invention, the conventional detectors are utilized, but the output signals of the detector are processed in a specific manner so that the abnormal conditions of various parts in the apparatus can be detected with ease. That is, a front passage signal and a rear passage signal provided by a light scan detector are added to form a signal, and the signal thus formed is utilized to check the powers of the two beams. Similarly, beam position signals output by the light position detector are added to form a signal, and the signal thus formed is utilized to check the two beams. The service lives of semiconductor lasers for outputting the light beams are checked on the basis of the characteristic of current temperature deterioration such that a current limiter is provided to check the beam power signal through current limitation. By these three detections, conditions such as abnormalities with the light sources, contamination of the lens system including contamination of the coupling lens, light splitter and focusing lens, the shift of the beams at the movable reflectors, and contamination of the light deflector and the $F\theta$ lens are separately identified.

In a conventional timer-operated distribution circuit, when one of the two beams becomes abnormal, the beam signal occurring later becomes abnormal. Based on this fact, the beam signal is monitored by a timer whose set time is longer than the scanning period of the light deflector which operates with relatively slow timing, thus the lowering of the reliability is prevented. That is, in the double beam scan type optical apparatus of the invention, the control unit and servo control circuit are improved to increase the reliability.

The nature, principle and utility of the invention is further explained in the following detailed description and the accompanying drawings.

BRIEF DESCRIPTION OF THE DRAWINGS

FIG. 6 is a graphical representation indicating characteristics of a semiconductor laser 49a;

DETAILED DESCRIPTION OF THE PREFERRED EMBODIMENT

One preferred embodiment of this invention, a double beam scan type optical apparatus, will be described with reference to FIGS. 1 through 8.

Figures 1, 2:
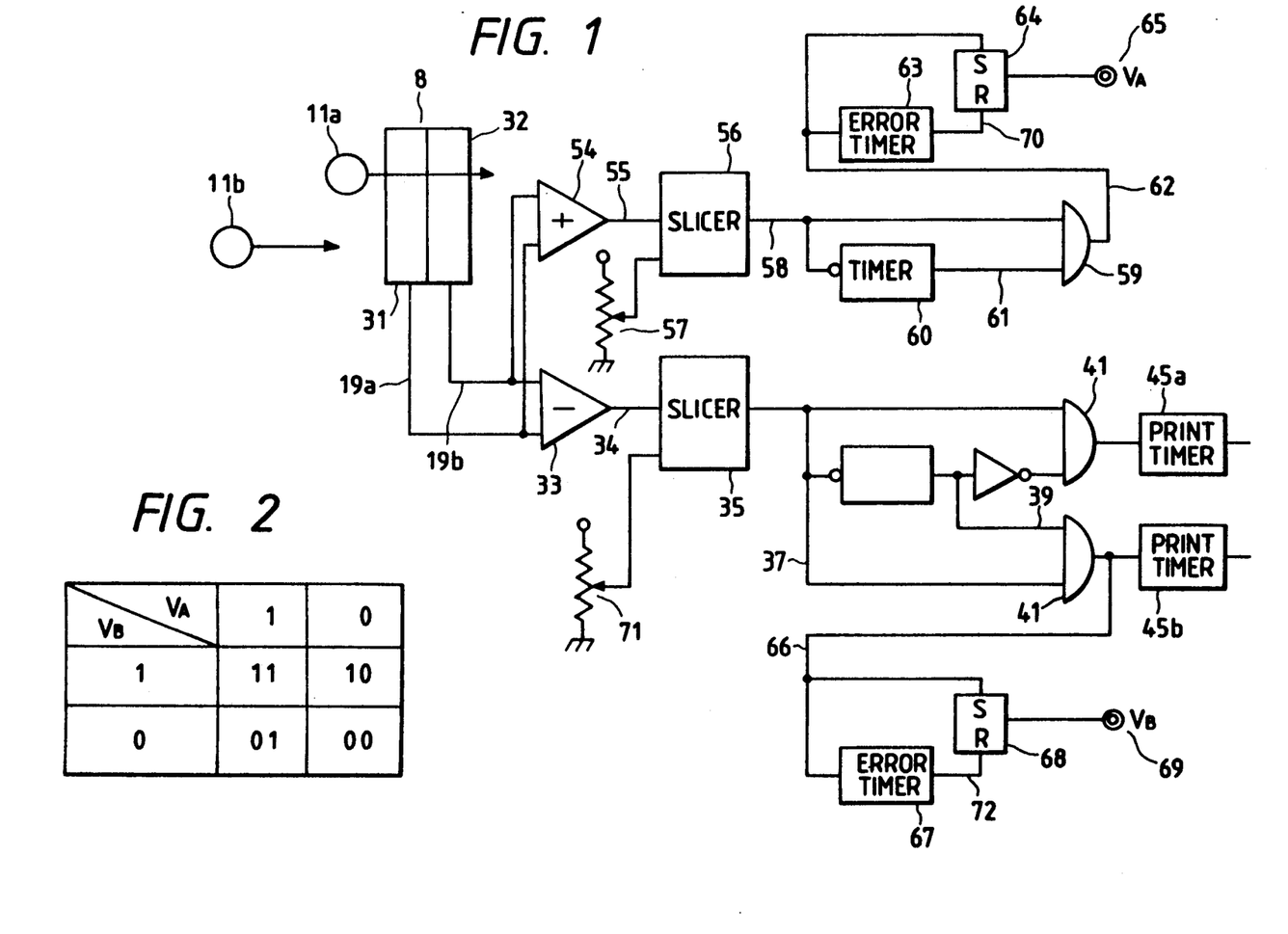
FIG. 1 is a circuit diagram describing an operation of processing the output signals of a light scan detector.
FIG. 2 is a table showing four states of outputs VA and VB with respect to "1" and "0" in FIG. 1.

In FIG. 1, when light beams 11a and 11b are applied to a light scan detector 8 comprising a front detector 31 and a rear detector 32, the front detector 31 and the rear detector 32 provide analog outputs, namely, front passage signal 19a and rear passage signal 19b, respectively. These passage signals 19a and 19b are applied to an adder 54, where they are added and output as a power passage signal 55. The power passage signal 55 is applied to a slicer 56, where it is sliced with a power slice voltage 57 into a pulse signal 58. The pulse signal 58 is applied to one input terminal of an AND gate 59 and to a timer 60 which is started by the trail edge of the pulse signal 58. The set time of the timer 60 is determined to be slightly longer than the difference between the time of arrival of the two beams 11a and 11b to the light scan detector and is sufficiently shorter than the scanning period of the light deflector 5 in FIG. 9 (prior art).

Referring back to FIG. 1, the timer output 61 of the timer 60 is applied to the other input terminal of the AND gate 59. That is, the pulse signal 58 and the timer output 61 are ANDed by the AND gate 59, and the output is applied as a power check signal 62 to an error timer 63 which is started by the lead edge of the power check signal 62 and to the S input of an RS latch 64 which provides an output "1" or "0" according to the power check signal 62. The set time of the error timer 63 is so determined that it is slightly longer than the scanning period of the light deflector 5 in FIG. 9 (prior art), and much shorter than twice the scanning period. The error timer 63 is started by the lead edge of the power check signal 62 and outputs a pulse 70 with the lapse of the set time. The output 70 of the error timer 63 is applied to the R input terminal of the RS latch 64. The RS latch 64 provides an output VA 65 which is at "1" when a pulse is received through the S input terminal, and at "0" when a pulse is received through the R input terminal.

A pulse check signal 66 indicative of the zero cross pulse signal 37 which is derived from the difference of the passage signals 19a and 19b is also obtained. The pulse check signal 66 is processed by an error timer 67 and an RS latch 68 into an output VB 69 which indicates the condition of the zero cross signal. The characteristic of the error timer 67 is equal to that of the above-described error timer 63, and the characteristic of the RS latch 68 is equal to that of the above-described RS latch 64.

FIG. 2 shows four states, state "11" through state "00", of the outputs VA and VB. In FIG. 2, "1" means a normal state, and "0" means an abnormal state. The output VA is indicative of the sum of the front passage signal 19a and the rear passage signal 19b, and the output VB is indicative of the zero cross signal of the front passage signal 19a and the rear passage signal 19b. More specifically, state "11" represents a normal condition; state "10" means that the beam power is insufficient, but the zero cross signal is normal; state "01" means that the beam power is sufficient, but the zero cross signal is abnormal; and state "00" means that both the beam power and the zero cross signal are abnormal.

Figure 3:
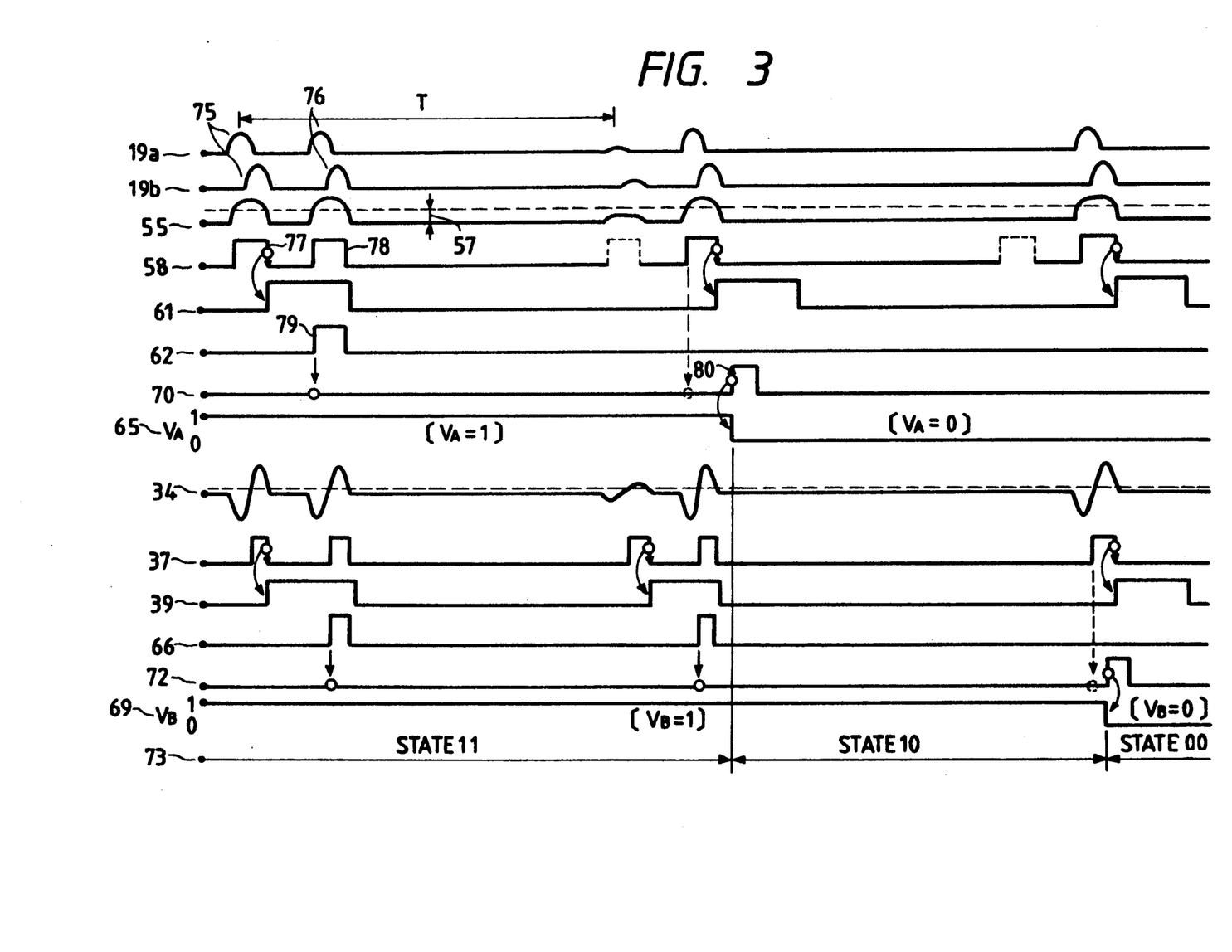
FIG. 3 is a time chart showing the transition of states "11", "10" and "00".

FIG. 3 is a time chart describing the transition of states "11", "10" and "00". More specifically, FIG. 3 shows the front passage signal 19a, the rear passage signal 19b, the power passage signal 55, the pulse signal 58, the timer output 61, the power check signal 62, the error timer output 70, the VA 65, the difference analog output 34, the pulse signal 37, the timer output 39, the pulse check signal 66, the error timer output 72, the VB 69, and the states 73. Further in FIG. 3, reference character T designates the scanning period of the light deflector in FIG. 9. Normally, the signal 75 of the beam 11a and the signal 76 of the beam 11b appear in the front passage signal 19a and 19b repeatedly with the period T. The two signals are added into the power passage signal 55, which is sliced with the pulse slice voltage 57 into the pulse signal 58. The timer output 61, to which access is made with the trail edge of the pulse signal 58, allows the passage of the following pulse 78 of the pulse signal 58 to form the power check signal 62. The error timer output 70 is effected in response to the lead edge 79 of the power check signal 62, and provides a pulse 80 when the next lead edge does not come in the set time. The pulse 80 thus provided sets the VA 65 to "0". The VB 69 is set to "0" in a similar manner with error timer output 72. In this embodiment, the detection is made when the signal 75 of the beam 11a is decreased. However, in the case where the signal 76 of the beam 11b is decreased, VA 65=0 can be obtained by the function of the timer output 61.

Figure 4:
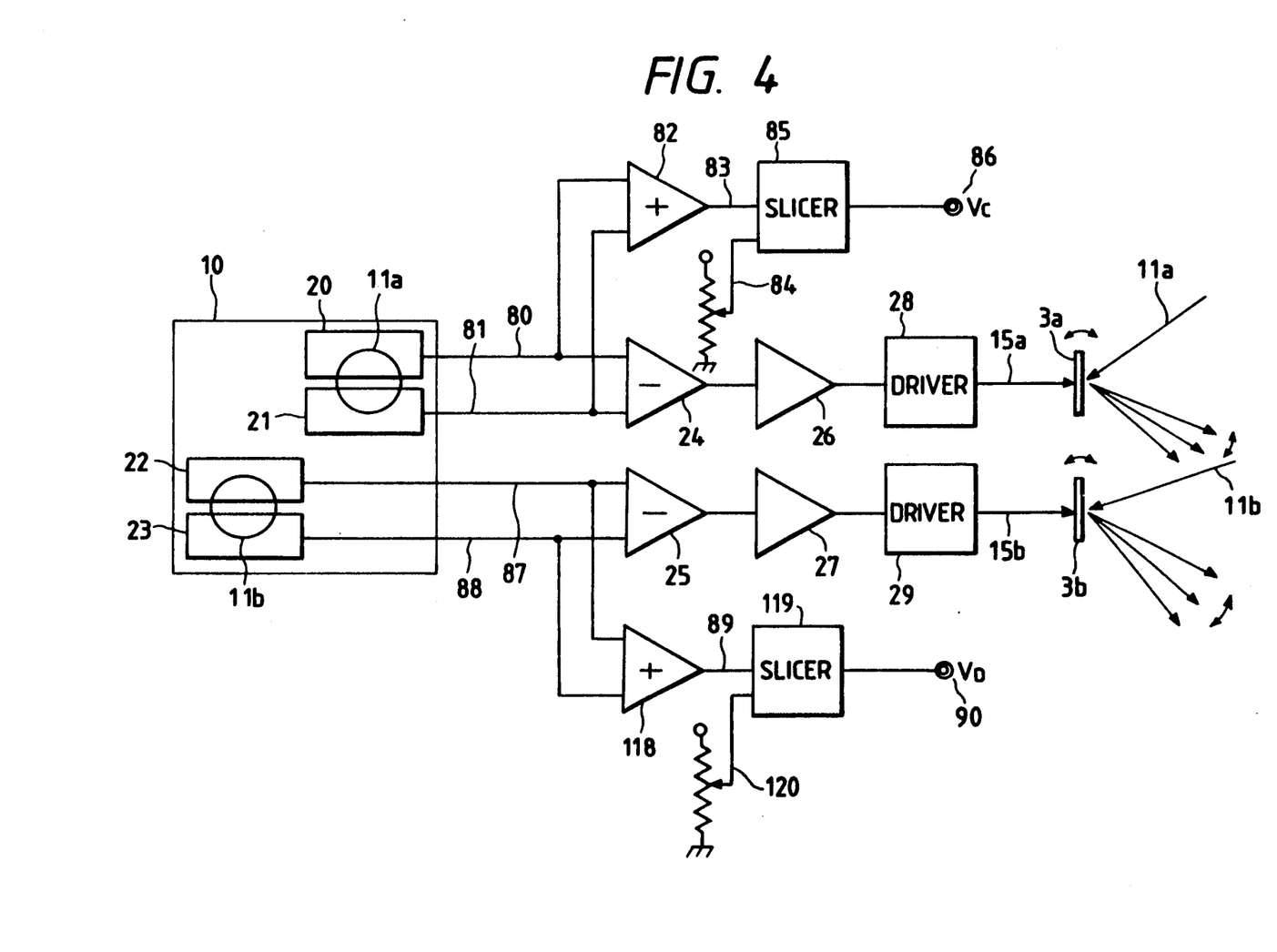
FIG. 4 is a circuit diagram describing an operation of processing the output signals of a light position detector.

FIG. 4 is a circuit diagram describing the processing of signals provided by the light position detector 10. As shown in FIG. 4, the light position detector 10 comprises: photo-detectors 20 and 21 provided for the beam 11a; and photo-detectors 22 and 23 provided for the beam 11b. A control method for the beam 11a is equal to that for the beam 11b. Therefore, the operation will be described with reference to the beam 11a only.

The output beam position signals 80 and 81 of the photo-detectors 20 and 21 are applied to a difference output unit 24, the output of which is applied through an amplifier 26 and a driver 28 to a movable reflector 3a to drive the latter 3a, thereby to control the position of the beam 11a. In this operation, control is so made that the difference between the beam position signals 80 and 81 is zeroed. Therefore, when the beam 11a is shifted from the photo-detectors 20 and 21, it cannot be detected. In order to overcome this problem, the beam position signals 80 and 81 are applied to an adder 82 to form a sum signal 83. The sum signal 83 is applied to a slicer 85, where it is sliced with a reference voltage 84 into an output VC 86. When the beam 11a is applied to the photo-detectors 20 and 21 the sum signal 83 of the beam position signals 80 and 81 is larger than the reference voltage 84, and the output VC 86 is at "1". Similarly as in the above-described case, when the beam, 11b is applied to the photo-detectors 22 and 23, the sum signal 89 of the beam position signals 87 and 88 is larger than the reference voltage 120, and the output VD 90 is at "1". As the power of the beam 11a decreases, the sum signal 83 is also decreased, and becomes smaller than the reference voltage 84, and the output VC 86 is set to "0". Also, when the beam 11a is shifted from the photo-detectors 20 and 21, the output VC 86 is set to "0". Thus, it can be determined by reading the outputs VC 86 and VD 90 whether or not the beams 11a and 11b are normal.

Figure 5:
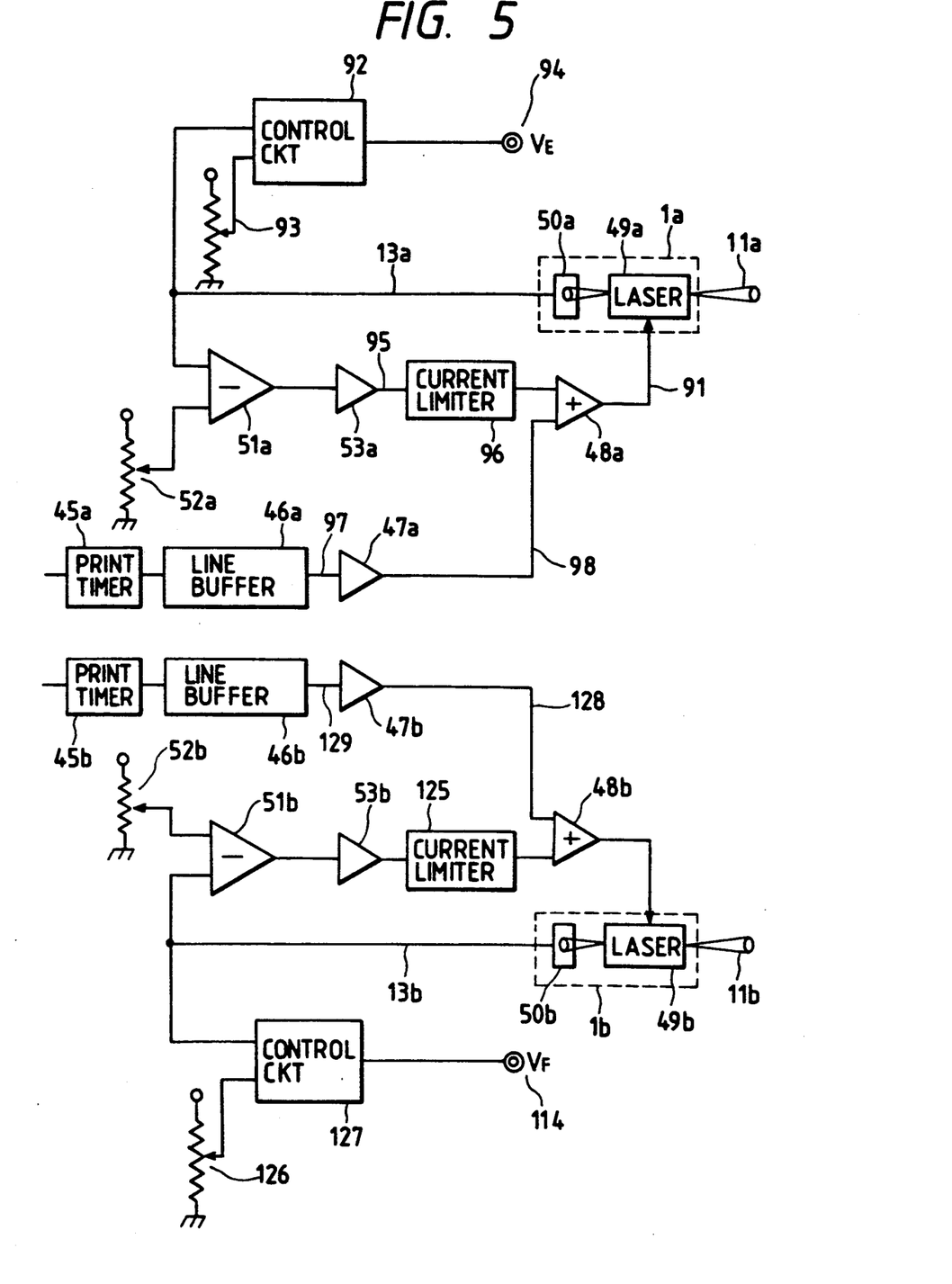
FIG. 5 is a circuit diagram describing an operation of processing the output of a laser power sensor.

FIG. 5 is a block diagram describing the operation of processing the output of a laser power sensor. The beams 11a and 11b are checked in the same manner, and therefore only the operation of checking the beam 11a will be described with reference to FIG. 5. The semiconductor laser 49a in a light source 1a outputs the beam 11a with the aid of the drive current 91 provided by a current adder 48a, and simultaneously applies a light beam to a laser power monitor sensor 50a in proportion to the beam 11a. In response to the light beam, the laser power monitor sensor 50a outputs a beam power signal 13a, which is applied to a power difference output unit 51a. The beam power signal 13a is further applied to another slicer 92, where it is sliced with a reference voltage 93. When the beam power signal 13a is greater than the reference voltage 93, the power of the output beam 11a of the semiconductor laser 49a is normal, and the output VE 94 is at "1". On the other hand, the power difference output unit 51a applies the difference between the beam power signal 13a and a reference power voltage 52a to a monitor voltage-current converter 53a. The voltage-current converter 53a outputs a control current 95 to zero the difference between the beam power signal 13a and the reference power voltage 52a. The control current 95 is supplied through a current limiter 96 to the aforementioned current adder 48a, where the output of current limiter 96 is added to a modulating current 98 which a voltage-current converter 47a provides by subjecting the output printing signal 97 of a line buffer 46a to voltage-to-current conversion. As a result, the current adder 48a outputs the aforementioned drive current 91 which is applied to the semiconductor laser 49a.

Figure 6:
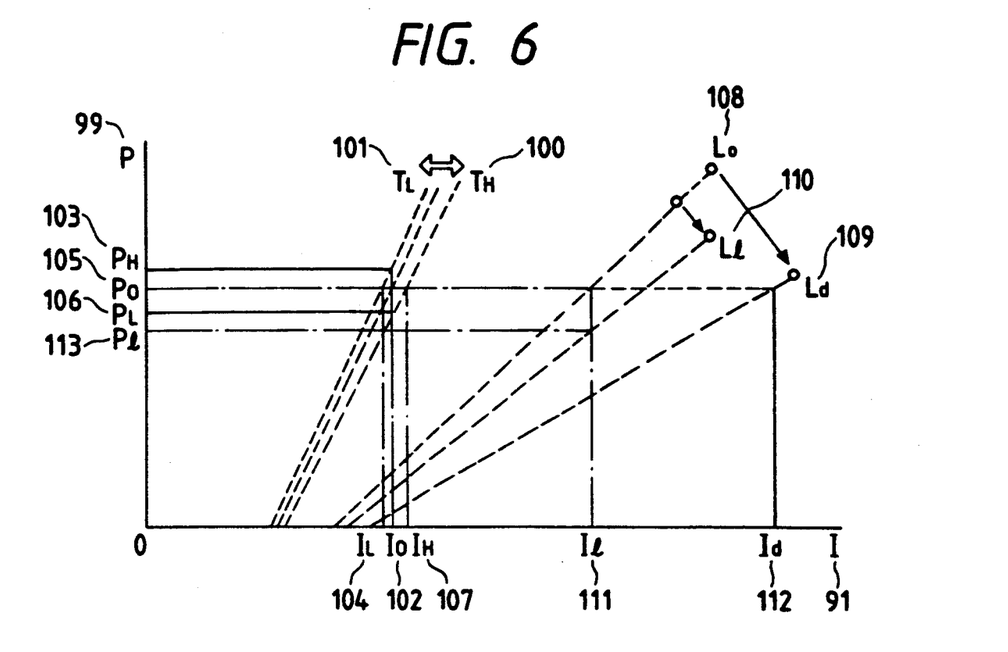

The characteristics of the semiconductor laser 49a are as shown in FIG. 6, in which the horizontal axis I represents the drive current 91, and the vertical axis P represents the output P 99 of the semiconductor laser 49a. The characteristic of the semiconductor 49a is dependent on temperature. At high temperatures, the characteristic of the semiconductor laser 49a as indicated at $T_H$ 100; and at low temperatures it is as indicated at $T_L$ 101. When a drive current $I_o$ 102 is supplied, with the characteristic $T_L$ 101, an output $P_H$ is provided whereby the beam power signal 13a is fed back to the control current 95 in FIG. 5 so that the drive current 91 is $I_L$ 104 and the output is $P_o$ 105.

With the characteristic $T_H$ 100 in FIG. 6, an output $P_L$ 106 is provided, whereby the drive current 91 is $I_H$ 107, and the output is $P_o$ 105.

Thus, in the circuit of FIG. 5, even if the temperature changes, the output is maintained at $P_o$ 105 at all times. The semiconductor laser 49a has a characteristic $L_o$ 108 and deteriorates gradually with time. In this configuration, a limit current $I_1$ 111 is set by the current limiter 96. If this limit current is not set, then the following problem will occur. Through the above-described control, the drive current I 91 is increased in order to maintain the output $P_o$ 105. As a result, the internal temperature of the semiconductor laser is increased, and therefore the semiconductor laser will have the high-temperature characteristic $T_H$ 100. In order to maintain the output $P_o$ 105 under this condition, the drive current I 91 is further increased. Thus, the deterioration of the semiconductor laser is accelerated and the laser develops a characteristic $L_d$ 109, thus being damaged. On the other hand, by the setting of the limit current $I_1$ 111, the semiconductor laser has a characteristic $L_1$ 110, and provides an output $P_1$ 113. In FIG. 5, the beam power signal 13a proportional to the output $P_1$ 113 is checked with the reference voltage 93 in the slicer 92, and the output VE 94 is set to "0", whereby the deterioration of the semiconductor laser 49a can be detected before the laser 49a is damaged. Similarly, for the other semiconductor laser 49b, with the output VF being set to "0", the deterioration of the semiconductor laser 49b can be detected before the laser 49b is damaged.

Figure 7:
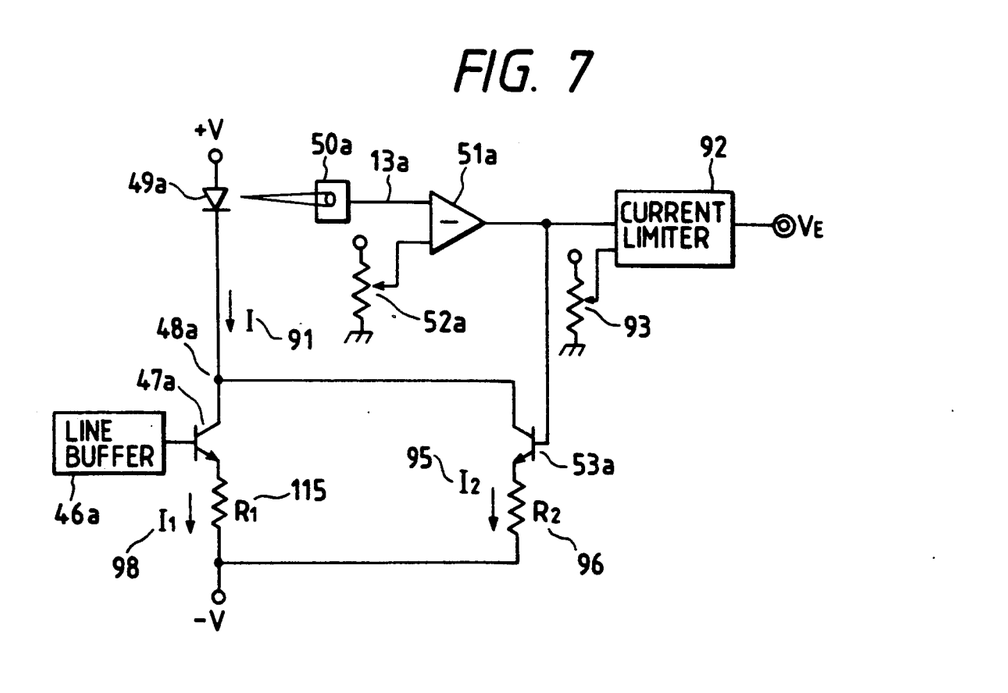
FIG. 7 is a circuit diagram showing a voltage-current converter 47a, a monitor voltage current converter 53a, a current limiter 48a, and a current limiter 96 of FIG. 5.

FIG. 7 is a circuit diagram showing the voltage-current converter 47a, the monitor voltage-current converter 53a, the current adder 48a, and the current limiter 96 in FIG. 5.

In FIG. 7, the voltage-current converter 47a and the monitor voltage-current converter 53a are made up of a transistor 47a and a transistor 53a, respectively. The current adder 48a is realized by connecting the collectors of transistors 47a and 53a, and the current limiter 96 is made up of a resistor $R_2$.

In the circuit of FIG. 7, the drive current I 91 is the sum of the modulating current $I_1$ 98 determined by a resistor $R_1$ 115 and a control current $I_2$ 95. Transistor 47a is in on-off switching operation, and transistor 53a is in non-saturated operation. However, when the output of the power difference output unit 51a increases the control current $I_2$ to the limit value, the transistor 53a is saturated, and the control current $I_2$ is saturated, therefore, the drive current I 91 becomes the limit current $I_1$ 111.

Figure 8:
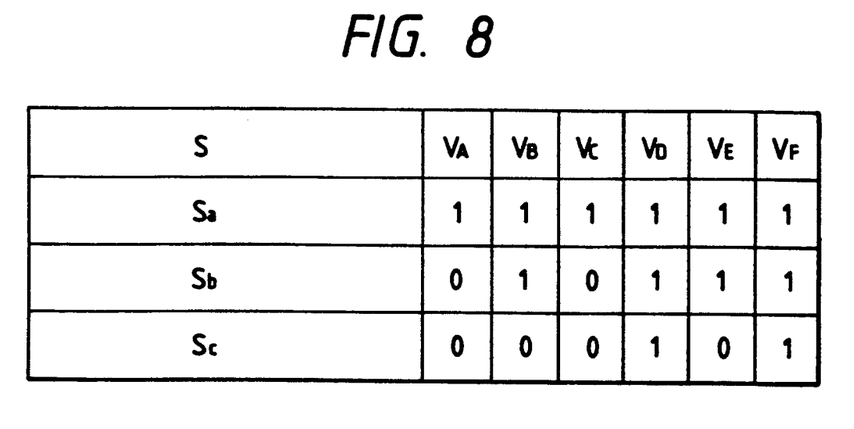
FIG. 8 is a table indicating errors with outputs VA through VF.

FIG. 8 shows examples of errors corresponding to the outputs VA through VF. In FIG. 8, in State Sa, all the outputs VA through VF are each at "1" (VA through VF = "1"), and no error exists.

In State Sb, outputs VA=VC="0", and the others are at "1". This represents the following: Because outputs VE=VF="1", in semiconductor lasers 49a and 49b, both the beams 11a and 11b are normal. Because output VC="0" and output VD="1", the input of the beam 11a the light position detector 10 is insufficient. Because output VA="0" and output VB="1", the input of the beam 11a to the light scan detector 8 is insufficient. Hence, there is a high probability that the lens system is contaminated between the coupling lens 2a and the light splitter 4 in FIG. 9 (prior art).

In State Sc, outputs VD=VF="1", and the others are at "0". This represents the following: There is a high probability that the beam 11a of the semiconductor laser 49a is deteriorated. For more accurate detection of the state of the semiconductor laser 49a, the deviations from the normal state Sa should be taken into account.

As was described above, in the double beam scan type optical apparatus of the invention, the conventional detectors are utilized, but the output signals of the detector are specifically processed according to the invention so that the abnormal conditions of various parts in the apparatus can be detected with ease. Thus, the reliability of a double beam scan type laser printer can be remarkably improved by the invention.

Although the preferred embodiment of this invention has been described, it will be obvious to those skilled in the art that various changes and modifications may be made therein without departing from the invention. Therefore, the claims are intended to include all such changes and modifications that fall within the true spirit and scope of the invention.

What is claimed is:

1. A double beam scan type optical apparatus comprising:
    two light sources for emitting light beams;
    scanning means for scanning a surface with parallel output light beams derived from said light beams provided by said two light sources, said scanning means comprising:
        reflecting means for providing direction paths for said light beams; and
        lens system means for focusing said light beams;
    output light beam detecting means for detecting said parallel output light beams and generating signals indicative thereof;
    light beam power controlling means for controlling intensities of said light beams of said two light sources in accordance with signals provided by said output light beam detecting means and a reference voltage, said light beam power controlling means generating signals including a pulse signal indicative of a difference in diameter sizes of said output light beams;
    light source beam detecting means, coupled to said light sources, for detecting an intensity of said light beams at said light sources and generating signals indicative thereof;
    beam intensity detecting means, coupled to said output light beam detecting means, for detecting an intensity of said parallel output light beams and generating signals indicative thereof;
    pulse signal checking means for checking a magnitude of said pulse signal generated by said light beam power controlling means and generating signals indicative thereof;
    light beam position detecting means for detecting a position of parallel reference light beams derived from said light beams provided by said two light sources, said parallel reference light beams being indicative of a position of said parallel output light beams, and generating signals indicative thereof;
    light beam position signal comparing means for comparing said signals provided by said light beam position detecting means and generating signals indicative thereof; and
    light beam position controlling means for moving said reflecting means thereby changing a position of said output light beams in accordance with signals provided by said light beam position detecting means, said light beam position controlling means being coupled to said light beam position detecting means and said reflecting means.

2. A double beam scan type optical apparatus as in claim 1, wherein said light source beam detecting means comprises:
    signal generating means for generating a beam power signal indicative of said intensity of said light beams at said light sources; and
    voltage comparison means for comparing said beam power signal to a reference voltage and providing signals indicative thereof.

3. A double beam scan type optical apparatus as in claim 1, wherein said beam intensity detecting means comprises:
    adding means for adding said signals provided by said output light beam detecting means and for providing signals indicative thereof; and
    voltage comparison means for comparing said signals provided by said adding means to a reference voltage and for providing signals indicative thereof.

4. A double beam scan type optical apparatus as in claim 1, wherein said light beam position signal comparing means comprises:
    adding means for adding said signals provided by said light beam position detecting means and for providing output signals indicative thereof; and
    voltage comparing means for comparing said output signals provided by said adding means to a reference voltage and for providing signals indicative thereof.

5. A method of double beam scanning comprising steps of:
    scanning a surface with two parallel output light beams provided by a double beam scan type optical apparatus, said apparatus comprising two light sources, reflectors and a lens system;
    detecting intensities of light beams provided by said two light sources and providing first signals indicative thereof;
    determining whether said intensities of said light beams provided by said two light sources are larger than a first predetermined value and providing second signals indicative thereof;
    controlling intensities of said light beams provided by said two light sources;
    detecting intensities of said parallel output light beams and providing third signals indicative thereof;
    detecting positions of parallel reference light beams derived from said light beams provided by said two light sources and providing fourth signals indicative thereof; and
    controlling a distance between said two parallel output light beams.

6. A method of double beam scanning as in claim 5 further comprising step of:
    determining whether said intensities of said parallel output light beams are larger than a second predetermined value and providing fifth signals indicative thereof.

* * * * *